(12) United States Patent
Moon et al.

(10) Patent No.: US 12,134,102 B2
(45) Date of Patent: Nov. 5, 2024

(54) AIRCRAFT CONTROLLED BY COMPRESSED AIR

(71) Applicant: CHANGINAVIATION CO., LTD., Incheon (KR)

(72) Inventors: Chang Mo Moon, Seoul (KR); Ji Ho Moon, Seoul (KR)

(73) Assignee: CHANGINAVIATION CO., LTD., Incheon (KR)

( * ) Notice: Subject to any disclaimer, the term of this patent is extended or adjusted under 35 U.S.C. 154(b) by 171 days.

(21) Appl. No.: 17/627,371

(22) PCT Filed: Jun. 26, 2020

(86) PCT No.: PCT/KR2020/008314
§ 371 (c)(1),
(2) Date: Jan. 14, 2022

(87) PCT Pub. No.: WO2021/025289
PCT Pub. Date: Feb. 11, 2021

(65) Prior Publication Data
US 2022/0258852 A1    Aug. 18, 2022

(30) Foreign Application Priority Data
Aug. 2, 2019  (KR) .................. 10-2019-0094184

(51) Int. Cl.
| | | |
|---|---|---|
| *B05B 1/14* | (2006.01) | |
| *B05B 1/00* | (2006.01) | |
| *B64C 15/14* | (2006.01) | |

(52) U.S. Cl.
CPC ............... *B05B 1/14* (2013.01); *B64C 15/14* (2013.01); *B05B 1/005* (2013.01)

(58) Field of Classification Search
CPC .......... B64C 15/14; B64C 15/00; B64C 15/02
See application file for complete search history.

(56) References Cited

U.S. PATENT DOCUMENTS 5,273,237 A * 12/1993 Guyton .................. B64C 15/14
244/3.22
6,073,881 A *  6/2000 Chen .................... B64C 29/0066
244/23 C
7,104,499 B1*  9/2006 Arata ...................... B64C 15/02
244/12.3

(Continued)

FOREIGN PATENT DOCUMENTS

CN      105947187 A  *  9/2016
DE         2643391 B3  *  9/2009 ............. B64C 15/14
(Continued)

*Primary Examiner* — Philip J Bonzell
*Assistant Examiner* — Anna L. Gordon
(74) *Attorney, Agent, or Firm* — Bridgeway IP Law Group, PLLC; Sang Ho Lee; Hyun Woo Shin

(57) ABSTRACT

An aircraft controlled by compressed air according to an embodiment of the present invention comprises: a fuselage (10) having main wings (20) on both sides thereof; a first nozzle (12) mounted to the roof of the fuselage (10); second nozzles (22) mounted on the top surfaces of the main wings (20); a first tank (31) disposed in the fuselage (10) or the main wings (20) and storing compressed air; and a main control valve (40) for controlling the compressed air so that the compressed air is provided to the first nozzle (12) or the second nozzles (22).

18 Claims, 3 Drawing Sheets

(56) References Cited

U.S. PATENT DOCUMENTS

| | | | | |
|---|---|---|---|---|
| 8,485,476 B2 * | 7/2013 | Zha | ................ | B64C 21/025 |
| | | | | 244/36 |
| 2009/0032315 A1 * | 2/2009 | Porter | ................ | F01D 1/026 |
| | | | | 180/54.1 |
| 2018/0334247 A1 * | 11/2018 | Lee | ................ | B64C 21/025 |

FOREIGN PATENT DOCUMENTS

| | | | | |
|---|---|---|---|---|
| FR | 2698440 A1 * | 5/1994 | ............ | F41G 7/36 |
| JP | 2007-030758 A | 2/2007 | | |
| JP | 2007118891 A * | 5/2007 | | |
| KR | 10-2048412 B1 | 11/2019 | | |

* cited by examiner

[FIG. 1]
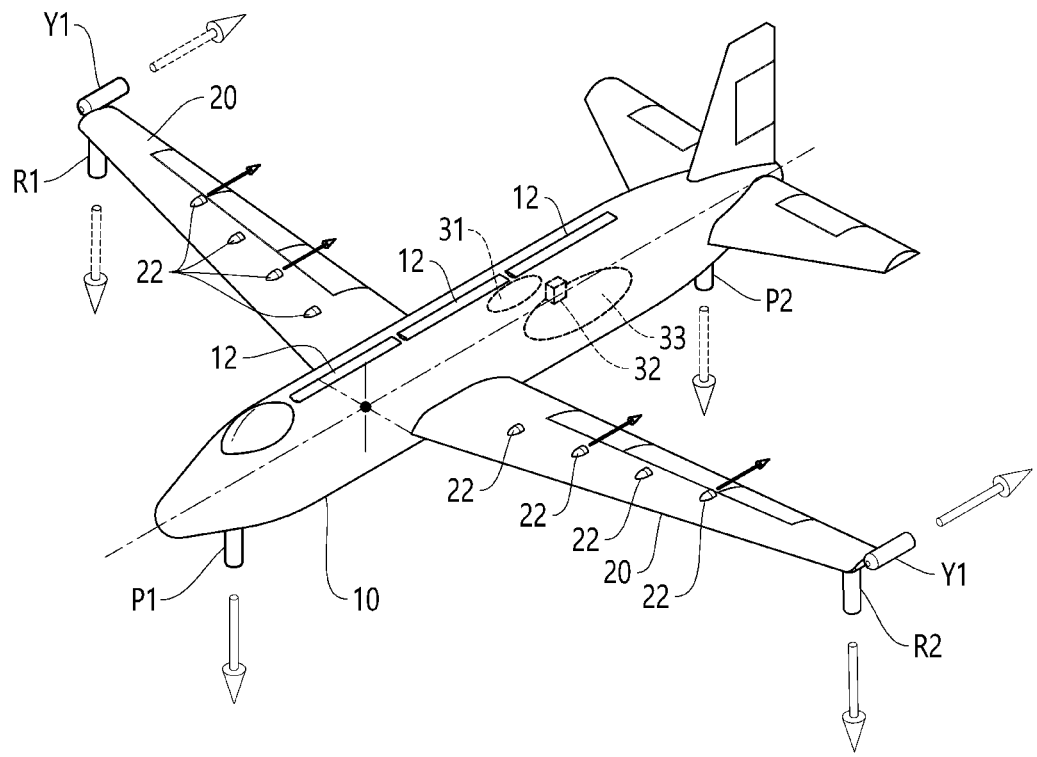
[FIG. 2]
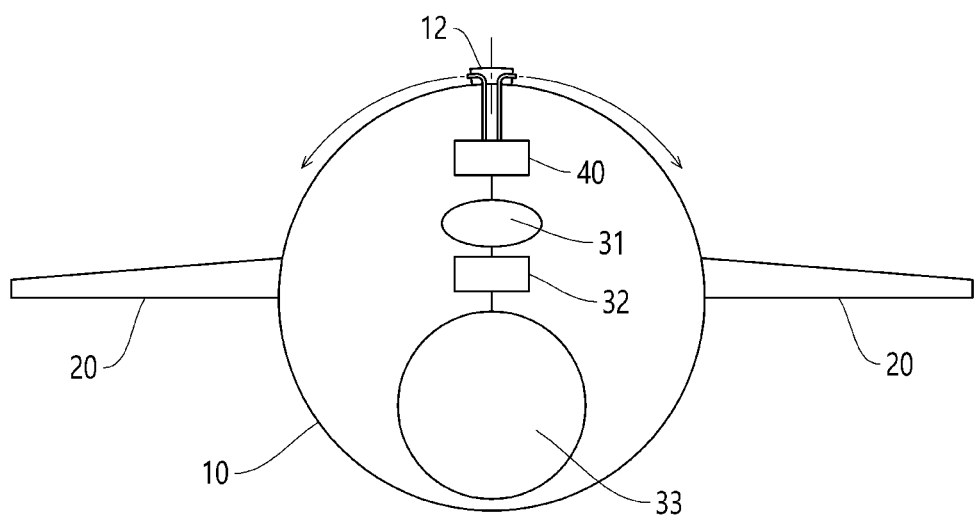

[FIG. 3]
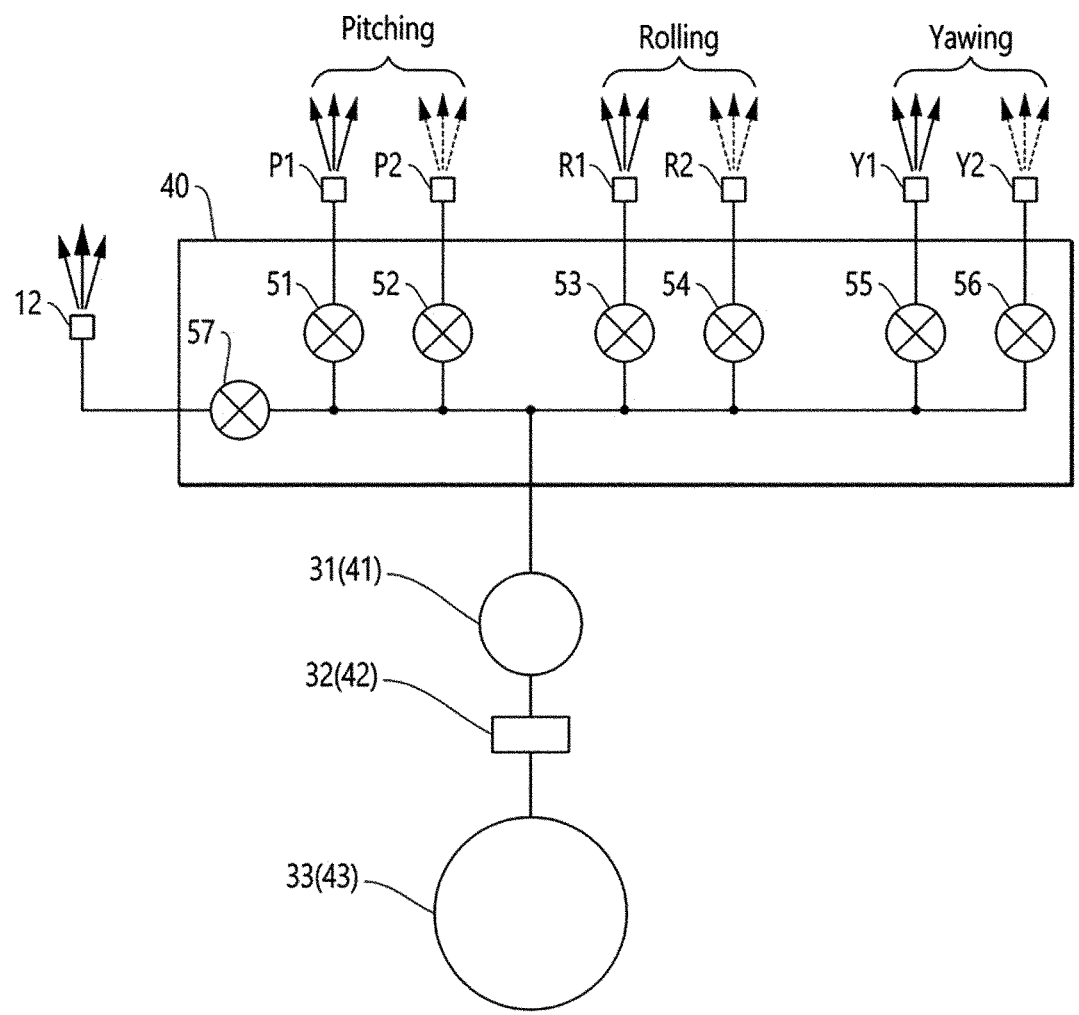

[FIG. 4]
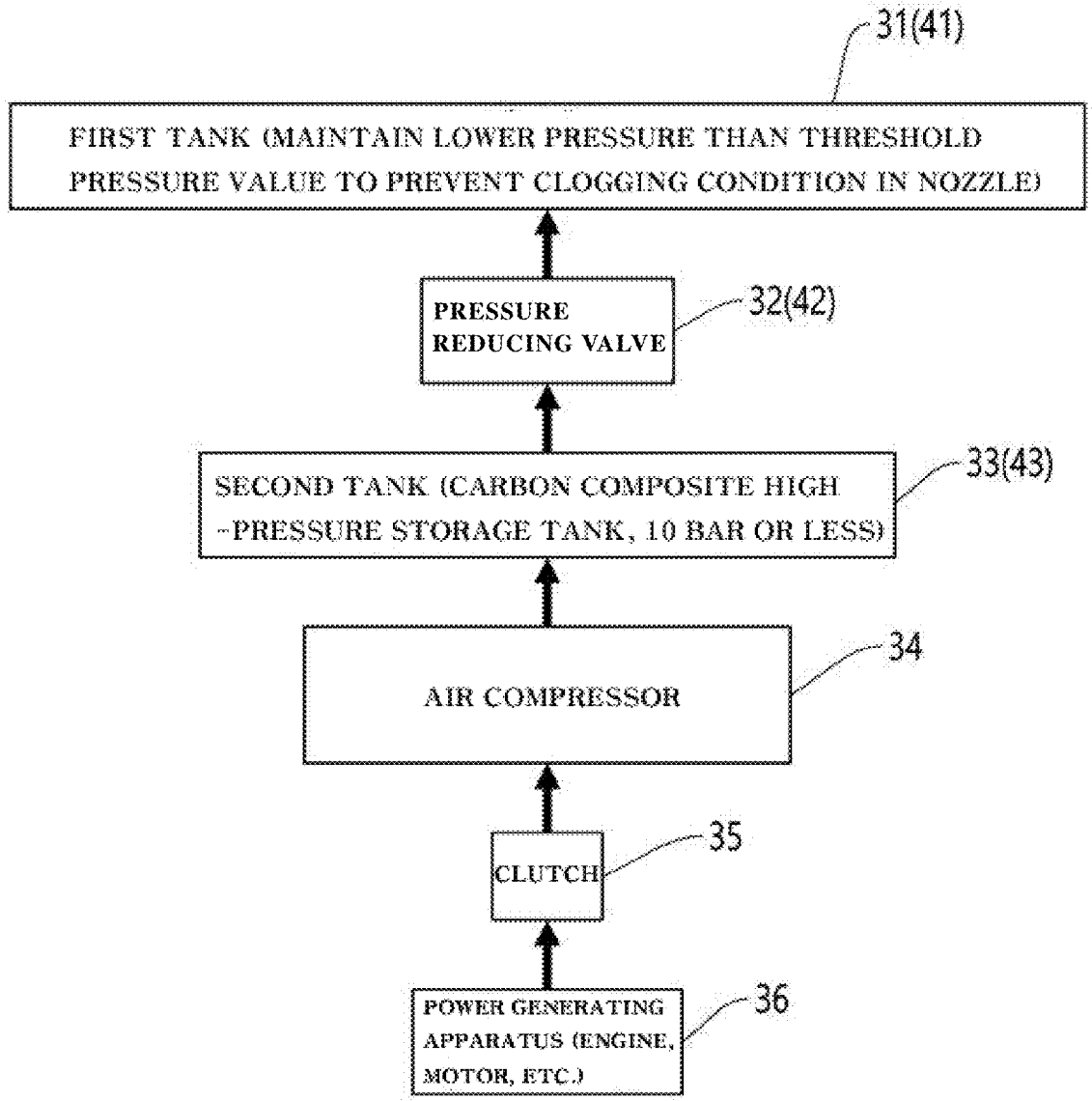

AIRCRAFT CONTROLLED BY COMPRESSED AIR

CROSS REFERENCE TO RELATED APPLICATIONS

This application is a 35 U.S.C. § 371 U.S. national phase entry of International Application No. PCT/KR2020/008314 having an international filing date of Jun. 26, 2020, which claims priority to Korean Patent Application No. 10-2019-0094184 filed Aug. 2, 2019; the entireties of which are hereby incorporated by reference herein.

FIELD OF INVENTION

The present invention relates to an aircraft for controlling an aircraft posture without using power energy generated from an engine or electric energy provided from a battery.

BACKGROUND OF INVENTION

In general, an aircraft generates power energy with an engine and operates a propeller using the power energy to obtain propulsion. In addition, the aircraft operates an electric motor using electric energy provided from a battery and operates the propeller using the electric motor to obtain propulsion.

When an aircraft takes off, the aircraft travels at high speed on a runway or allows a lot of air to flow in a vertical descending direction in order to generate lift, and in this process, a lot of energy is consumed. A fuel tank or a battery of the aircraft is limited, and thus the flight distance is inevitably reduced by the amount of energy consumed.

During flight, engine failure occurs for an unknown reason or battery power is discharged, and such emergency occurs and emergency landing is required.

When emergency occurs, a pilot needs to move to a place for emergency landing by manually manipulating an aircraft to control an aircraft posture, but there is a problem in that it is not easy to precisely control the aircraft posture.

In particular, a pilot manually manipulates an aircraft to control an aircraft posture, and for example, the pilot manually manipulates the aircraft to raise a left wing aileron and to lower a right wing aileron in order to turn the aircraft to the left.

However, when thrust of the aircraft is weakened, there is a problem in that it is difficult to precisely control the aircraft, and for example, the aircraft is not capable of being turned left and continues to fly in a traveling direction even if spoilers of left and right wings are adjusted.

CITED REFERENCE (Patent Document 1) KR10-2017-0136849 A
(Patent Document 2) KR10-2019-0042971 A

SUMMARY OF INVENTION

Technical Problem to be Solved

A technical objective to be achieved by the present invention is to provide an aircraft controlled by compressed air for increasing a flight time by reducing energy consumption during short take-off or landing, vertical take-off or landing, and transition flight.

Another technical objective to be achieved by the present invention is to provide an aircraft controlled by compressed air for controlling an aircraft posture in emergency in which engine failure occurs or a battery problem occurs.

Technical Solution

To achieve the above objectives, an aircraft controlled by compressed air according to an embodiment of the present invention includes a fuselage 10 having a main wing 20 at opposite sides, a first nozzle 12 installed on a roof of the fuselage 10, a second nozzle 22 installed on an upper surface of the main wing 20, a first tank 31 disposed in the fuselage 10 or the main wing 20 and configured to store compressed air, and a main control valve 40 controlled to provide the compressed air to the first nozzle 12 or the second nozzle 22.

In the aircraft controlled by compressed air according to an embodiment of the present invention, the first nozzle 12 may be installed in a plural number in a longitudinal direction of the fuselage 10.

The first nozzle 12 of the aircraft controlled by compressed air according to an embodiment of the present invention may be disposed to spray compressed air in a direction toward the main wing 20 based on a longitudinal direction of the fuselage 10.

The second nozzle 22 of the aircraft controlled by compressed air according to an embodiment of the present invention may be disposed to spray compressed air to a rear side of the main wing 20. In addition, the second nozzle 22 may be disposed to spray the compressed air in a backward direction based on a longitudinal direction of the fuselage 10.

An aircraft controlled by compressed air according to an embodiment of the present invention may include a first tank 41 disposed in the fuselage 10 or the main wing 20 and configured to store compressed air, a first pitching nozzle P1 disposed on a lower front side of the fuselage 10 and configured to spray compressed air in a downward direction, a second pitching nozzle P2 disposed on a lower rear side of the fuselage 10 and configured to spray compressed air in a downward direction, a first rolling nozzle R1 disposed at a right end of the main wing 20 and configured to spray compressed air in a downward direction, a second rolling nozzle R2 disposed at a left end of the main wing 20 and configured to spray compressed air in a downward direction, a first yaw nozzle Y1 disposed at a right end of main wing 20 and configured to spray compressed air in a backward direction, and a second yaw nozzle Y2 disposed at a left end of the main wing 20 and configured to spray compressed air in a backward direction, in order to control a posture during short take-off or landing, vertical take-off or landing, transition flight, and emergency landing.

The first and second pitching nozzles P1 and P2, the first and second rolling nozzles R1 and R2, and the first and second yaw nozzles Y1 and Y2 of an aircraft controlled by compressed air according to an embodiment of the present invention may be controlled separate control valves 51, 52, 53, 54, 55, and 56, respectively.

An aircraft controlled by compressed air according to an embodiment of the present invention may include second tanks 33 and 43 configured to store compressed air, and pressure reducing valves 32 and 42 configured to reduce pressure of the compressed air stored in the second tanks 33 and 43.

Specific details of other embodiments are included in the detailed description and drawings.

Effect of Invention

As described above, an aircraft controlled by compressed air according to an embodiment of the present invention may contribute to generating lift for allowing an aircraft to rise by spraying compressed air from a fuselage roof and allowing a sprayed stream to flow along a surface of a fuselage to lower pressure at the surface of the fuselage during this process, and accordingly energy consumption for short take-off or landing, vertical take-off or landing, and transition flight of the aircraft may be reduced and a flight distance may be reduced by reduction in energy consumption.

An aircraft controlled by compressed air according to an embodiment of the present invention may contribute to generating lift for allowing an aircraft to rise by spraying compressed air to an upper surface of a wing and allowing a sprayed stream to flow along a surface of the wing to lower pressure at the surface of the wing during this process, and accordingly energy consumption for short take-off or landing, vertical take-off or landing, and transition flight of the aircraft may be reduced and a time for short take-off or landing, vertical take-off or landing, and transition flight, which are to be vulnerable to posture control depending on an external environment to increase a flight distance by reduction in energy consumption while enhancing stability.

An aircraft controlled by compressed air according to an embodiment of the present invention may control an aircraft posture to be changed more clearly by disposing nozzles all over the aircraft and controlling compressed air to spray compressed air stored in a tank from the nozzles even if emergency occurs and energy is not capable of being obtained from an engine or a battery.

BRIEF DESCRIPTION OF DRAWINGS

FIG. 1 is a diagram for explaining an aircraft controlled by compressed air according to an embodiment of the present invention.

FIG. 2 is a diagram an example in which compressed air is compressed from a fuselage roof in an aircraft controlled by compressed air according to an embodiment of the present invention.

FIG. 3 is a diagram for explaining an example in which compressed air is provided to each nozzle in an aircraft controlled by compressed air according to an embodiment of the present invention.

FIG. 4 is a diagram for explaining an example of a common system when various propulsion methods are applied to an aircraft controlled by compressed air according to an embodiment of the present invention.

BEST MODE

The attached drawings for illustrating exemplary embodiments of the present invention are referred to in order to gain a sufficient understanding of the present invention, the merits thereof, and the objectives accomplished by the implementation of the present invention.

Hereinafter, some embodiments of the present invention will be described in detail with reference to the accompanying drawings. The following embodiments described below are illustratively shown to help the understanding of the present invention and it should be understood that the present invention is implemented with various modifications different from the embodiments described herein. However, in the following description of the present invention, a detailed description of known functions and configurations incorporated herein will be omitted when it may make the subject matter of the present invention unclear. In addition, the accompanying drawings are not drawn to scale, but the size of some components may be exaggerated to help the understanding of the invention.

It will be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

The terms used in the specification are defined in consideration of functions used in the present invention, and can be changed according to the intent or conventionally used methods of producers, and accordingly, definitions of the terms should be understood on the basis of the entire description of the present specification.

Throughout this specification, the same reference numerals in the drawings denote the same element.

[Explanation of Reference Numerals]

| | |
|---|---|
| 10: fuselage | 12: first nozzle |
| 20: main wing | 22: second nozzle |
| 31 and 41: first tanks | 33 and 43: second tanks |
| 32 and 42: pressure reducing valves | 40: main control valve |
| 51, 52, 53, 54, 55, 56, and 57: control valves | |
| P1 and P2: first and second pitching nozzles | |
| R1 and R2: first and second rolling nozzles | |
| Y1 and Y2: first and second yaw nozzles | |

MODE FOR THE INVENTION

Hereinafter, an aircraft controlled by compressed air according to an embodiment of the present invention will be described with reference to FIGS. 1 to 3. FIG. 1 is a diagram for explaining an aircraft controlled by compressed air according to an embodiment of the present invention. FIG. 2 is a diagram an example in which compressed air is compressed from a fuselage roof in an aircraft controlled by compressed air according to an embodiment of the present invention. FIG. 3 is a diagram for explaining an example in which compressed air is provided to each nozzle in an aircraft controlled by compressed air according to an embodiment of the present invention.

The aircraft controlled by compressed air according to an embodiment of the present invention may include a fuselage 10, main wings 20, first and second nozzles 12 and 22, a plurality of nozzles P1, P2, R1, R2, Y1, and Y2 for control of the aircraft posture, a first tank 31 or 41, the main control valve 40, and a plurality of control valves 51, 52, 53, 54, 55, and 56.

As shown in FIG. 1, the fuselage 10 may include the main wings 20 at opposite sides.

As shown in FIGS. 1 and 2, the first nozzle 12 may be installed at a roof of the fuselage 10.

As shown in FIG. 1, the second nozzle 22 may be installed on an upper surface of the main wing 20. The second nozzle 22 may be provided with a small gap with a wide shape, and thus when compressed air is sprayed, a jet stream may be formed on a surface of the main wings 20.

The first tank 31 may be disposed in the fuselage 10 or the main wing 20 and may store compressed air.

The first tank 41 may be disposed in the fuselage 10 or the main wings 20 and may store compressed air.

As shown in FIG. 4, the compressed air may be used to charge air using an air compressor 34, and the air compressor 34 may be operated as power of an engine, an electric motor, or the like. The compressed air may be dried.

The air compressor 34 may be a pneumatic blower, an air compressor, or the like.

The compressed air may be supplied before flight from the outside of the aircraft.

The main control valve 40 may be controlled to provide the compressed air to the first nozzle 12 or the second nozzle 22.

The main control valve 40 may have a plurality of valves, and the first nozzle 12 or the second nozzle 22 may discharge compressed air by opening any one specific control valve 57 among a plurality of valves.

The main control valve 40 may be operatively associated with a control stick. For example, while a pilot manipulates the control stick in order to take off the aircraft, compressed air may be sprayed through the first and second nozzles 12 and 22.

In the aircraft controlled by compressed air as configured above according to an embodiment of the present invention, the Coanda effect is generated, and thus a jet stream may be formed by allowing compressed air to flow along a roof of the fuselage 10 or a surface of the main wing 20 and spaying the compressed air at high speed, and the jet stream may flow along a surface of the aircraft.

The jet stream may lower a pressure (static pressure) of the surface along which the stream flows, thereby contributing to generating lift to allow the aircraft to rise.

That is, the aircraft controlled by compressed air according to an embodiment of the present invention may contribute to generating lift using compressed air while attempting short take-off or landing or vertical take-off and landing, thereby reducing energy consumption.

In particular, an aircraft may consume a lot of energy when taking off vertically, and in this regard, the aircraft controlled by compressed air according to an embodiment of the present invention may further increase a flight time or a flight distance by reducing energy consumption during take-off.

As shown in FIG. 1, the first nozzle 12 may be installed in a plural number in a longitudinal direction of the fuselage 10. Thus, even if the size of the fuselage 10 is large, stronger lift may be achieved by lowering pressure on a surface using compressed air in several places.

As another aspect, the first nozzles 12 may be arranged to allow compressed air to be sprayed in a direction toward the main wings 20 from the fuselage 10. The first nozzles 12 may spray compressed air toward a rear side of the fuselage 10 and the main wings 20.

Thus, the injected high-pressure stream has the same velocity component by a propulsion speed of the aircraft even if there is a propulsion speed of the aircraft during short-distance take-off and landing and transition flight, and accordingly, pressure on an upper surface around the fuselage 10 may contribute to maintaining lift without any significant effect.

In another aspect, the second nozzle 22 may be disposed to allow compressed air to be sprayed toward a rear side of the main wing 20. The second nozzle 22 may be disposed to allow the compressed air to be sprayed backward based on a longitudinal direction of the fuselage 10.

Thus, the compressed air sprayed from the second nozzle 22 may flow along an upper surface of the main wing 20 to form a jet stream, the jet stream may lower pressure of the upper surface of the main wing 20, and as a result, may contribute to generate lift to allow the main wing 20 during short-distance take-off and landing and transition flight.

The aircraft controlled by compressed air according to an embodiment of the present invention may include first and second pitching nozzles P1 and P2, first and second rolling nozzles R1 and R2, and first and second yaw nozzles Y1 and Y2.

As shown in FIG. 1, the first pitching nozzle P1 may be disposed on a lower front side of the fuselage 10 to spray compressed air in a downward direction. When compressed air is sprayed from the first pitching nozzle P1, a nose may rise in a direction in which a front side of the aircraft is raised according to action and reaction.

As shown in FIG. 1, the second pitching nozzle P2 may be disposed on a lower rear side of the fuselage 10 to spray compressed air in a downward direction. When compressed air is sprayed from the second pitching nozzle P2, a rear side of the aircraft may be lifted according to action and reaction and a front side of the aircraft may be relatively lowered, and as a result, the nose may be lowered.

That is, the first pitching nozzle P1 and the second pitching nozzle P2 may be controlled to adjust an aircraft nose.

The first rolling nozzle R1 may be disposed at a right end of the main wing 20 and may spray compressed air in a downward direction.

Similarly, the second rolling nozzle R2 may be disposed at a left end of the main wing 20 and may spray compressed air in a downward direction.

That is, the first and second rolling nozzles R1 and R2 may be controlled to tilt both sides of the aircraft up and down.

The first yaw nozzle Y1 may be disposed at a right end of the main wing 20 and may spray compressed air in a backward direction.

Similarly, the second yaw nozzle Y2 may be disposed at a left end of the main wing 20 and may spray compressed air in a backward direction.

That is, the first and second yaw nozzles Y1 and Y2 may be controlled to turn the aircraft left and right.

Accordingly, the aircraft controlled by compressed air according to an embodiment of the present invention may control compressed air to be sprayed from a specific nozzle to more rapidly and actively change an aircraft posture, and in particular, safer flight and safer landing may be expected in that the aircraft posture is capable of being precisely controlled during transition flight in emergency.

The aircraft controlled by compressed air according to an embodiment of the present invention may selectively provide compressed air to a desired specific nozzle or two or more nozzles using the plurality of control valves 51 to 56, and thus compressed air may be used efficiently without wasting.

As shown in FIG. 3, the plurality of control valves 51 to 56 may be disposed inside the main control valve 40, and thus it may be advantageously convenient to centralize and manage multiple valves.

As shown in FIGS. 1 to 3, the aircraft controlled by compressed air according to an embodiment of the present invention may further include pressure reducing valves 32 and 42 and second tanks 33 and 43.

The second tanks 33 and 43 may store high-pressure air and may store a larger amount of air in a limited space.

The pressure reducing valves 32 and 42 may reduce compressed air stored in the second tanks 33 and 43 and may store the compressed air in the first tanks 31 and 41.

That is, the aircraft controlled by compressed air according to an embodiment of the present invention may store a larger amount of compressed air with high density, may reduce pressure of air compressed at high pressure to appropriate pressure using the pressure reducing valves 32 and 42 to store the compressed air in the first tanks 31 and 41, and may use the compressed air stored in the first tank 41 to control the aircraft posture. That is, the compressed air for control may control the aircraft posture while applying precisely controlled impact in a short time by increasing a principle and a moment of action and reaction, and thus may be separated as high pressure as possible is required.

In more detail, according to Formula 1, the first tanks 31 and 41 may reduce pressure to a threshold pressure value in such a way that a number obtained by dividing an atmospheric pressure by a pressure inside the first tanks 31 and 41 before air is sprayed out of the aircraft is equal to or greater than 0.528. Thus, it may be possible to prevent unnecessary energy loss such as noise and vibration caused by shock waves through appropriate reduction in pressure. The pressure inside the first tanks 31 and 41 may be maintained to be low, and thus a clogging condition may not occur in each nozzle.

$$Pb \div Pa \geq 0.528 \qquad \text{[Formula 1]}$$

Pa: pressure inside the first tanks 31 and 41
Pb: atmospheric pressure

In another aspect, the aircraft controlled by compressed air according to an embodiment of the present invention may attempt landing in an open area for minimizing damage even if there is no proper runway while attempting emergency landing.

Various methods may be selected as a propulsion method of the aircraft controlled by compressed air according to an embodiment of the present invention, and for example, a reciprocating engine, a turbo shaft, a turbo fan engine, or the like may be selected or an electric battery, a motor propulsion method, or the like may be selected.

However, a system displayed in FIG. 4 may be common irrespective of a propulsion method. FIG. 4 is a diagram for explaining an example of a common system when various propulsion methods are applied to an aircraft controlled by compressed air according to an embodiment of the present invention.

As shown in FIG. 4, the aircraft controlled by compressed air according to an embodiment of the present invention may include a power generating apparatus 36, a clutch 35, and an air compressor 34.

The power generating apparatus 36 may generate power for operating the air compressor 34 and may be an engine, a motor, or the like.

The clutch 35 may connect or block power to the air compressor 34.

The air compressor 34 may be operated by the power to compress air and may provide the compressed air to the first tank 31 or the second tank 33. The air compressor 34 may be a pneumatic blower, an air compressor, or the like.

Through various propulsion methods, for short take-off or landing, vertical take-off and landing, and transition flight, short take-off or landing, vertical take-off and landing, and transition flight may be performed using compressed air, and for cruise flight, a cruising distance may be effectively increased using various propulsion methods such as an engine or an electric motor.

The aircraft controlled by compressed air according to an embodiment of the present invention may use a thrust reversible propeller for adjusting an angle of attack thereof and oppositely generating propulsion in order to prevent thrust from being generated in a forward direction during vertical take-off or landing using a propulsion method.

Although the embodiments of the present invention have been described above with reference to the accompanying drawings, those skilled in the art to which the present invention pertains may implement the present invention in other specific forms without changing the technical spirit or essential features.

Therefore, the embodiments described above are to be understood as illustrative and not restrictive in all respects, the scope of the present invention is indicated by the following claims, and the meaning of the claims and all changes or modifications derived from the scope and equivalents thereof should be construed as being included in the scope of the present invention.

INDUSTRIAL APPLICABILITY

An aircraft controlled by compressed air according to an embodiment of the present invention may contribute to generating lift therein and may use the lift to change an aircraft posture in the case of emergency.

The invention claimed is:

1. An aircraft comprising:
a fuselage having a main wing at opposite sides and elongated along a longitudinal direction of the fuselage;
a first nozzle disposed on a roof of the fuselage and elongated along the longitudinal direction of the fuselage;
a plurality of second nozzles disposed on an upper surface of the main wing along a longitudinal direction of the main wing;
a first tank disposed in the fuselage or the main wing and configured to store first compressed air; a main control valve configured to provide the first compressed air to the first nozzle or the plurality of second nozzles;
a second tank configured to store second compressed air;
a pressure reducing valve configured to reduce a pressure of the second compressed air of the second tank and coupled to the first tank;
a first pitching nozzle disposed on a lower front side of the fuselage and configured to spray the first compressed air in a downward direction;
a second pitching nozzle disposed on a lower rear side of the fuselage and configured to spray the first compressed air in the downward direction;
a first rolling nozzle disposed at a right end of the main wing and configured to spray the first compressed air in the downward direction;
a second rolling nozzle disposed at a left end of the main wing and configured to spray the first compressed air in the downward direction;
a first yaw nozzle disposed at a right end of main wing and configured to spray the first compressed air in a backward direction; and
a second yaw nozzle disposed at a left end of the main wing and configured to spray the first compressed air in the backward direction,
wherein a pressure of the first compressed air is lower by a predetermined amount compared to the pressure of the second compressed air.

2. The aircraft according to claim 1, wherein the first nozzle is disposed in a plural number along a longitudinal direction of the fuselage.

3. The aircraft according to claim 1, wherein the first nozzle is disposed to spray the first compressed air in a direction toward the main wing from the fuselage.

4. The aircraft according to claim 1, wherein the plurality of second nozzles is disposed to spray the first compressed air to a rear side of the main wing.

5. The aircraft according to claim 1, wherein the main control valve includes:
- a first control valve configured to control the first pitching nozzle;
- a second control valve configured to control the second pitching nozzle;
- a third control valve configured to control the first rolling nozzle;
- a fourth control valve configured to control the second rolling nozzle;
- a fifth control valve configured to control the first yaw nozzle; and
- a sixth control valve configured to control the second yaw nozzle.

6. The aircraft according to claim 1, wherein the pressure of the first compressed air of the first tank meets a formula: $Pb/Pa \geq 0.528$, where Pb denotes an atmospheric pressure, and Pa denotes the pressure of the first compressed air of the first tank.

7. The aircraft according to claim 1, wherein the first tank is disposed in the main wing.

8. The aircraft according to claim 1, wherein the pressure of the second compressed air of the second tank is 10 bar or less and higher than the pressure of the first compressed air.

9. The aircraft according to claim 8, wherein the pressure of the first compressed air is a threshold pressure according to a formula: $Pb/Pa \geq 0.528$.

10. The aircraft according to claim 1, wherein the first pitching nozzle, second pitching nozzle, first rolling nozzle, second rolling nozzle, first yaw nozzle, and second yaw nozzle are configured to control an aircraft posture by spraying the first compressed air stored in the first tank in an emergency where an engine or a battery of the aircraft is incapable of providing energy.

11. The aircraft according to claim 1, wherein the first nozzle is configured to spray the first compressed air from the roof of the fuselage and to allow the first compressed air to flow along a surface of the fuselage.

12. The aircraft according to claim 1, wherein each of the plurality of second nozzles has a predetermined gap with an elongated shape configured to create a jet stream on the upper surface of the main wing.

13. The aircraft of claim 1, wherein the aircraft further comprises an air compressor configured to compress air to store the air as the second compressed air in the second tank, and wherein the air compressor is configured to be operated by power of an engine or an electric motor.

14. The aircraft of claim 13, wherein the air compressed by the air compressor is dried.

15. The aircraft of claim 1, wherein the aircraft is configured to selectively provide the first compressed air to one or more selected from the first nozzle, the plurality of second nozzles, first pitching nozzle, second pitching nozzle, first rolling nozzle, second rolling nozzle, first yaw nozzle, or second yaw nozzle.

16. The aircraft of claim 15, wherein the aircraft is configured to control an aircraft posture in a transition flight in an emergency by selectively providing the first compressed air to one or more selected from the first pitching nozzle, second pitching nozzle, first rolling nozzle, second rolling nozzle, first yaw nozzle, or second yaw nozzle.

17. The aircraft of claim 1, wherein the aircraft is configured to utilize the first compressed air in a short take-off or landing, vertical take-off or landing, and a transition flight.

18. The aircraft of claim 1, wherein the main control valve is configured to operate in connection with a control stick of the aircraft.

* * * * *